Figure 1:
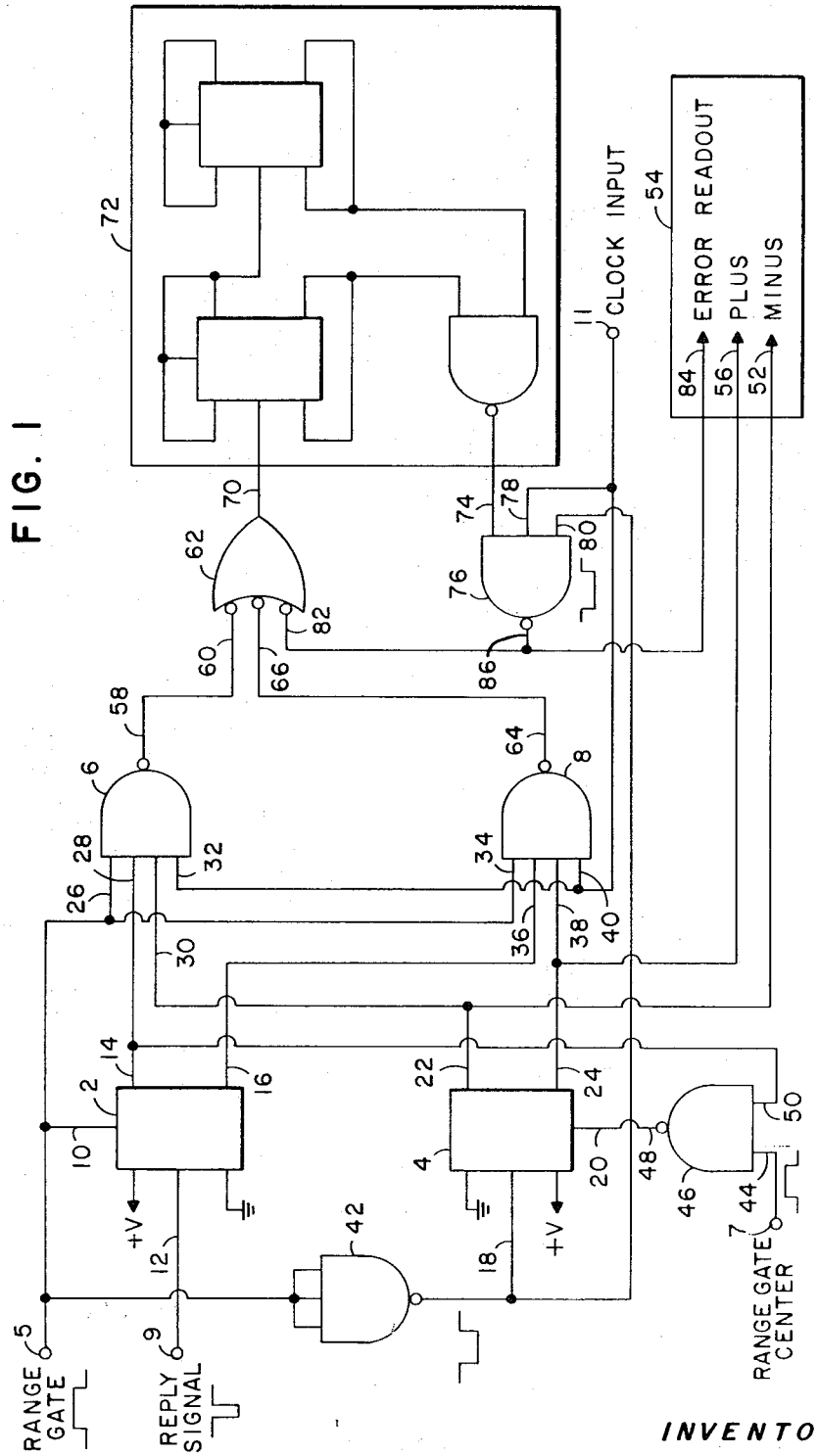

United States Patent

[11] 3,618,085

| [72] | Inventor | Thomas L. Hall<br>Ft. Wayne, Ind. |
|---|---|---|
| [21] | Appl. No. | 876,619 |
| [22] | Filed | Nov. 14, 1969 |
| [45] | Patented | Nov. 2, 1971 |
| [73] | Assignee | Collins Radio Company<br>Cedar Rapids, Iowa |

[54] ERROR DETECTOR FOR DIGITAL DME SYSTEMS
6 Claims, 2 Drawing Figs.

[52] U.S. Cl. ...................................... 343/7.3,
343/5 DP
[51] Int. Cl. ...................................... G01s 9/14,
G01s 9/56
[50] Field of Search ........................... 343/5 DP,
7.3

[56] References Cited
UNITED STATES PATENTS

| 3,246,324 | 4/1966 | Price | 343/7.3 |
| 3,412,400 | 11/1968 | Aker | 343/7.3 |

*Primary Examiner*—T. H. Tubbesing
*Attorneys*—Robert M. Sperry and R. J. Crawford ABSTRACT: This invention relates to an error detector for distance-measuring radio equipment (DME) comprising digital means for detecting a reply signal arriving at any time during the range gate established by the DME system and generating a signal indicative of the amount and direction of displacement of the reply signal arrival from the range gate center.

INVENTOR.
THOMAS L. HALL
BY Robert M. Sperry
ATTORNEY

ERROR DETECTOR FOR DIGITAL DME SYSTEMS

This invention relates to distance-measuring radio equipment (DME) and is particularly directed to error-detecting means for use with DME systems.

As is well known, DME systems are employed in aircraft navigation to measure the distance of an aircraft from a suitable radio station on the ground. Briefly, such systems operate by measuring the time required for a radio signal to travel from the aircraft to the ground station and return. In order to minimize detection of erroneous signals, it is customary to cause the DME system to establish a range gate which activates the receiver portion of the system only during a brief interval of time centered about the expected arrival time of a reply signal. A more detailed description of a DME system may be found in U.S. Pat. No. 3,360,795, issued 26 Dec. 1967 to Michael W. Lundgreen and John B. Majerus. Unfortunately, the actual arrival time of such signals may vary somewhat, due to noise, modulation and other influences which are unrelated to distance. Consequently, a reply signal may actually arrive slightly before or slightly after the expected arrival time for a given distance and, unless this condition is detected and compensated for, will result in an erroneous distance indication. Since such errors normally amount to only a few tenths of a mile at most, many prior art DME systems have simply ignored the problem. However, in some instances, accuracy at such distances may be critical. Thus, where the DME is part of an automatic landing system, errors of this magnitude may make the difference between a safe landing and a catastrophe.

These disadvantages of prior art DME systems are overcome with the present invention and means are provided for detecting and compensating for errors resulting from such causes. The advantages of the present invention are preferably attained by providing means for detecting a reply signal arriving at any time during the range gate established by the DME system and generating a signal indicative of the amount and direction of displacement of the reply signal arrival from the range gate center.

Accordingly, it is an object of the present invention to provide means for improving the accuracy of DME systems.

Another object of the present invention is to provide means for detecting and compensating for errors in reply signal arrival time due to atmospheric conditions and the like.

A specific object of the present invention is to provide means for detecting a reply signal arriving at any time during the range gate established by the DME system and generating a signal indicative of the amount and direction of displacement of the reply signal arrival from the range gate center.

These and other objects and features of the present invention will be apparent from the following detailed description taken with reference to the figures of the accompanying drawing.

Figure 2:
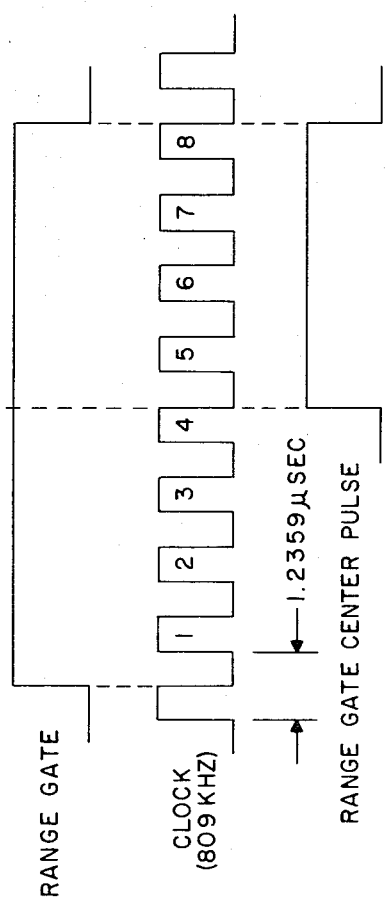

In the drawing:

FIG. 1 is a diagrammatic representation of an error detection system embodying the present invention; and FIG. 2 is a diagrammatic representation showing the time relationship of the range gate signal, range gate center signal, and the clock pulses of the error detection system of FIG. 1.

In describing the form of the present invention chosen for purposes of illustration, it will be understood that DME systems conventionally include a clock pulse generator which emits a train of pulses at a frequency such that the period between pulses is equal to the round trip travel time over 0.1 nautical miles under "standard" conditions; a receiver for detecting the arrival of a reply signal; and a range gate circuit which provides signals to activate the receiver only during a brief time interval centered about the expected arrival time of a reply signal. A more detailed description of these components and their functions is contained in the aforementioned patent. However, it may be stated that the distance measurement is performed by counting the pulses emitted by the clock pulse generator from the transmission of an interrogation signal, at the start of each cycle, until a reply signal is received. Since the frequency of the clock pulses is based upon the travel time of the signals under "standard" conditions, operation of the system under nonstandard conditions may result in receipt of the reply signal slightly before or slightly after the "expected arrival time". To accommodate this, the range gate circuit provides signal to activate the receiver for a time interval (for example, eight pulses) centered about the expected arrival time. This time interval is referred to as the "range gate" and the purpose of the present invention is to determine any variance between the expected and actual arrival times and to provide an indication of the direction and magnitude of such variance.

FIG. 1 illustrates the error detection circuit of the present invention, while FIG. 2 shows the timing sequence of the input signals which actuate the circuit of FIG. 1. The range gate signal, shown in line A of FIG. 2, and the range gate center pulse, shown in line C of FIG. 2, are both generated by the range gate circuit of the DME system with which the error detection circuit of the present invention is associated. Similarly, the clock pulses, seen in line B of FIG. 2, and the reply pulses, not shown, are supplied by the DME system.

As seen in FIG. 1, the error detection circuit of the present invention comprises a pair of bistable or "flip-flop" circuits 2 and 4 and a pair of four-input AND-circuits 6 and 8. Bistable circuit 2 has two input terminals 10 and 12 and two output terminals 14 and 16. Similarly, bistable circuit 4 has two input terminals 18 and 20 and two output terminals 22 and 24. The four input terminals of AND-circuit 6 are designated 26, 28, 30 and 32, respectively; while the input terminals of AND-circuit 8 are indicated at 34, 36, 38 and 40. The range gate circuit of the associated DME system is connected through range gate input 5 to apply the range gate signal to input 10 of bistable circuit 2, input 26 of AND-circuit 6, input 34 of AND-circuit 8, and through a suitable inverter 42 to input 18 of bistable circuit 4. In addition, the range gate circuit of the DME system is connected to apply the range gate center pulse through range gate center input 7 to input terminal 44 of AND-circuit 46 which has its output terminal 48 connected to input terminal 20 of bistable circuit 4. Input terminal 12 of bistable circuit 2 is connected through reply input 0 to the 9 of the DME system to receive reply signals detected by the DME system during the range gate. Output terminal 14 of bistable circuit 2 is connected to input 28 of AND-circuit 6 and to input 50 of AND-circuit 46. Output 16 of bistable circuit 2 is connected to input 36 of AND-circuit 8. Bistable circuit 4 has one output 22 connected to input 30 of AND-circuit 6 and to the MINUS input 52 of error-indicating means 54, while the other output 24 is connected to input 38 of AND-circuit 8 and the PLUS input 56 of error-indicating means 54. In addition, the clock circuit of the associated DME system is connected through clock input 11 to apply clock pulses to input 32 of AND-circuit 6 and input 40 of AND-circuit 8. The output 58 of AND-circuit 8 is connected to input 60 of OR-circuit 62, while the output 64 of AND-circuit 8 is connected to input 66 of OR-circuit 62. The output 70 of OR-circuit 62 is connected to input of counter 72, while the output of counter 72 is connected to input 74 of AND-circuit 76. AND-Circuit 76 has a second input 78 connected to clock input 11 to receive clock pulses from the DME system and has a third input 80 connected through inverter 42 to range gate input 5 to receive the range gate signal from the DME system. Finally, the output 86 of AND-circuit 76 is connected to the input 82 of OR-circuit 62 and to the ERROR READOUT portion 84 of error-indicating means 54.

In operation, the width of the range gate signal and the repetition rate of the clock pulses are determined by the associated DME system. In a typical DME system, he clock pulses are generated at a frequency of 809 kHz. (corresponding to 0.1 nautical miles) while the range gate has a width of eight clock pulses and is centered at the expected location of a reply signal. The range gate center pulse has a width of four clock pulses, starting at the center of the range gate and ending simultaneously with the range gate signal. The time relationship of these signals is illustrated in FIG. 2. When the DME system opens the range gate, the range gate signal is applied to input 26 of AND-circuit 6, input 34 of AND-circuit 8, input 10 of bistable circuit 2, and through inverter 42 to input 18 of bistable circuit 4. This conditions bistable circuit 2 to provide a signal on output terminal 14 which is applied to input 28 of AND-circuit 6 and input 50 of AND-circuit 46. However, no signal is provided to output 16 of bistable circuit 2. Similarly, application of the inverted range gate signal causes bistable circuit 4 to provide a signal on output 22 which is applied to input 30 of AND-circuit 6 and to MINUS input 52 of error-indicating means 54. However, no signal is applied to output 24 of bistable circuit 4. Clock pulses are continuously applied to input 32 of AND-circuit 6 and input 40 of AND-circuit 8.

From the foregoing, it will be seen that, at the start of the range gate, signals are applied to all inputs of AND-circuit 6, whereas signals are applied only to inputs 34 and 40 of AND-circuit 8. Thus, AND-circuit 8 is "OFF," while AND-circuit 6 is "ON" and passes clock pulses through OR-circuit 62 to counter 72. Counter 72 is preferably a two-bit binary counter and, as seen in FIG. 2, four clock pulses are provided between the start of the range gate signal and the start of the range gate center pulse. Hence, if no reply signal is received during the first half of the range gate, four clock pulses will be applied by clock input 11 to AND-circuit 6 and will be passed through OR-circuit 62 to counter 72, causing counter 72 to accumulate its maximum count at the center of the rage gate. If a reply signal is received during the first half of the range gate, the reply signal will be applied through reply signal input 9 to input 12 of bistable circuit 2, causing bistable circuit 2 to apply a signal to output terminal 16 and to discontinue the signal on output terminal 14. This causes AND-circuit 6 to be turned "OFF", halting the flow of clock pulses to counter 72; and causes AND-circuit 46 to be turned "OFF" to render AND-gate 46 ineffective in passing the range gate center pulse from input 44 thereof to bistable circuit 4 to change the state of circuit 4 and, as will be further evident, thus preventing passage of clock pulses during the second half of the range gate as defined by the duration of the range gate center pulse. Thus, if a reply signal is received one pulse prior to the center of the range gate, AND-gate circuit 6 will pass three clock pulses to counter 72 before the reply signal turns AND-circuit 6 "OFF".

If no reply signal is received during the first half of the range gate, bistable circuit 2 remains in its initial condition wherein no signal is applied to output 16, holding AND-circuit 8 "OFF," and a signal is applied to output 14, causing AND-circuits 6 and 46 to be "ON". At the center of the range gate, the range gate center pulse is applied through input 7 and AND-circuit 46 to input 20 of bistable circuit 4. This causes bistable circuit 4 to remove the signal from output 22, causing AND-circuit 6 and MINUS input 52 of error-indicating means 54 to be turned "OFF"; and applies a signal through output terminal 24 to turn "ON" input 38 of AND-circuit 8 and PLUS input 56 of error-indicating means 54. In this condition, AND-circuit 8 has signals applied to inputs 34, 48 and 40, but it is held "OFF" since no signal is applied to input 36. However, if a reply signal is received during the second half of the range gate, it will be applied through inputs 9 and 12 to cause bistable circuit 2 to remove the signal from output 14 and apply the signal through output 16 to input 36 of AND-circuit 8. When this occurs, AND-circuit 8 turns "ON" and passes clock pulses through OR-circuit 62 to counter 72 until the end of the range gate. Thus, if a reply signal is received two pulses after the range gate center, AND-circuit 8 remains "OFF" until the reply signal is received and then turns "ON" and passes two clock pulses before the end of the range gate. At the end of the range gate, the range gate signal is removed from input 34 of AND-circuit 8 which turns AND-circuit 8 "OFF" and stops the flow of clock pulses through OR-circuit 62 to counter 72.

To summarize briefly, when the range gate signal is applied to input 5, AND-circuit circuit 6 is turned "ON" and passes clock pulses to counter 72, during the first half of the range gate, until a reply signal is received or until the range gate center pulse is applied to input 7. If no reply signal is received during the first half of the range gate, the range gate center pulse serves to turn AND-circuit 6 "OFF" and to arm AND-circuit 8. However, AND-circuit 8 remains "OFF" until a reply signal is received during the second half of the range gate. When this occurs, AND-circuit 8 turns "ON" and passes clock pulses to counter 72 until the end of the range gate. Thus, regardless of whether the reply pulse is received before or after the center of the range gate, the number of pulses passed to counter 72 will be equal to four minus the displacement of the reply pulse from the center of the range gate. Application of the range gate center pulse also serves to remove the signal from the MINUS input 52 of error-indicating means 52 and to apply a signal to the PLUS input 56 and, hence, will indicate whether the reply pulse was received before or after the center of the range gate.

To provide the error indication, counter 72 is constructed to apply a signal to input 74 of AND-circuit 76 whenever counter 72 holds a count other than zero. Clock pulses are applied continuously to input 78 of AND-circuit 76. However, input 80 of AND-circuit 76 is connected to receive the inverted range gate signal from inverter 42. This serves to hold AND-circuit 76 in its "OFF" condition during the range gate and to cause AND-circuit 76 to turn "ON" at the end of the range gate, when the range gate signal is removed. When this occurs, AND-circuit 76 applies the clock pulses through input 82 of OR-circuit 62 to advance the counter 72 and, simultaneously, applies the clock pulses to error readout 84 of error-indicating means 54. As indicated previously, when the range gate ends, counter 72 will hold a count equal to four minus the displacement of the reply pulse from the center of the range gate. Thus, if the reply signal is displaced one count from the center of the range gate, counter 72 will receive three clock pulses during the range gate. When the range gate ends, the inverted range gate signal will be removed from input 80 of AND-circuit 76; causing AND-circuit 76 to pass one clock pulse to error readout 84 of error-indicating means 54 and, simultaneously, to apply the pulse through OR-circuit 62 to advance counter 72. Since counter 72 has accumulated three counts during the range gate, this pulse causes counter 72 to reach its full count, whereupon, counter 72 removes its signal from input 74 of AND-circuit 76 and causes AND-circuit 76 to turn "OFF". Thus, the number of pulses passed by AND-circuit 76 to the error readout 84 will be equal to the displacement of the reply signal from the center of the range gate; while the direction of the displacement will be indicated by the signal on MINUS input 52 or PLUS input 56, as discussed above. The signals supplied to the error-indicating means 54 may be displayed visually or may be utilized in any appropriate manner, such as being supplied to the servomechanism of the associated DME system to suitably adjust the DME system.

Obviously, numerous variations and modifications may be made without departing from the present invention. Accordingly, it should be clearly understood that the form of the present invention described above and shown in the accompanying drawing is illustrative only and is not intended to limit the scope of the invention.

What is claimed is:

1. An error detector system for use with distance-measuring radio equipment having means for establishing a range gate defining signal, means for establishing a range gate center signal, a source of clock pulses, and means for receiving reply signals; said error detector system comprising:

a pulse counter;

means actuated by initiation of said range gate defining signal to pass clock pulses to said counter and responsive to receipt of either a reply signal or said range gate center signal to discontinue passage of said clock pulses to said counter, means responsive to receipt of a reply signal subsequent to receipt of said range gate center signal to pass said clock pulses to said counter and responsive to cessation of said range gate defining signal to discontinue passage of said clock pulses to said counter, error-indicating means, and means responsive to accumulation by said counter of a count other than zero operable upon cessation of said range gate defining signal to pass clock pulses to said counter and said error-indicating means.

2. An error detector system for use with distance-measuring radio equipment having means for establishing a range gate defining signal, means for establishing a range gate center signal, a source of clock pulses, and means for receiving reply signals; said error detector system comprising:

a pulse counter;

a first "AND" circuit connected to said counter and said source of clock pulses operable to pass said clock pulses to said counter during the first half of said range gate, a second "AND" circuit connected to said counter and said source of clock pulses operable to pass said clock pulses to said counter during the second half of said range gate, first switch means connected to receive said range gate defining signal and said range gate center signal operable to energize said first "AND" circuit and deenergize said second "AND" circuit during the first half of said range gate and responsive to said range gate center signal to deenergize said first "AND" circuit and to energize said second "AND" circuit, second switch means connected to receive said reply signal and operable in response thereto to deenergize said first "AND" circuit and to energize said second "AND" circuit, error-indicating means, and means responsive to accumulation by said counter of a count other than zero operable upon cessation of said range gate defining signal to pass said clock pulses to said counter and to said error-indicating means.

3. The apparatus of claim 2 wherein:

said counter provides an output signal whenever said counter holds a count other than zero, and said last named means is an "AND" circuit connected to receive the output from said counter, clock pulses from said source, and to receive and be deenergized by said range gate defining signal.

4. The apparatus of claim 2 wherein:

said first switch means includes means applying a first signal to said error-indicating means during the first half of said range gate and applying a second signal to said error-indicating means during the second half of said range gate.

5. The apparatus of claim 2 wherein:

said counter is a two-bit binary counter.

6. The apparatus of claim 2 wherein:

said range gate defining signal is applied to arm said first and second "AND" circuits during the duration thereof.

* * * * *

UNITED STATES PATENT OFFICE
CERTIFICATE OF CORRECTION

Patent No. 3,618,085   Dated November 2, 1971

Inventor(s) Thomas L. Hall

It is certified that error appears in the above-identified patent and that said Letters Patent are hereby corrected as shown below:

Column 2, line 39, after "input" delete "0 to the 9" and substitute therefor --9 to the receiver--; line 48, before "the" insert --to--; line 52, after "circuit" (first occurrence) delete "8" and substitute therefor --6--; line 66, after "system" (second occurrence) delete "he" and substitute therefor --the--.

Signed and sealed this 2nd day of May 1972.

(SEAL)
Attest:

EDWARD M. FLETCHER, JR.
Attesting Officer

ROBERT GOTTSCHALK
Commissioner of Patents